May 9, 1944.  S. M. PARKER  2,348,493
LANDING GEAR FOR AIRCRAFT
Filed Dec. 30, 1941  2 Sheets-Sheet 2

Inventor.-
S. M. Parker
By Stearns & Davis
Attys.

Patented May 9, 1944

2,348,493

UNITED STATES PATENT OFFICE 2,348,493

LANDING GEAR FOR AIRCRAFT

Sydney MacDonald Parker, Leamington Spa, England, assignor to Automotive Products Company Limited, Leamington Spa, England Application December 30, 1941, Serial No. 424,974
In Great Britain January 3, 1941

6 Claims. (Cl. 244—104)

This invention relates to landing gear for aircraft, and more particularly to mountings for landing wheels or equivalent landing members (such as endless tracks) which are capable of angular movement about a substantially vertical axis to permit the aircraft to travel readily in a curved path when supported by its landing gear on the ground. Such landing members are the tailwheel of an aircraft having the well-known form of landing gear comprising two or more transversely spaced main wheels forward of the centre of gravity, and a single wheel near the tail of the aircraft; and the nose wheel of the more recent form of landing gear commonly referred to as the "tricycle undercarriage."

These landing members, when deflected from their true fore-and-aft position by striking an obstruction or by any other cause, may tend to oscillate about their normal positions for a considerable period, throwing great strain on the aircraft structure, and rendering control difficult, and various measures have been proposed to damp out such oscillations, such as friction bands and other friction means, and hydraulic damping.

One known kind of mounting for a landing wheel or equivalent comprises a shock absorber strut consisting of a cylinder and a plunger reciprocable therein, the cylinder of the strut being mounted in the aircraft framework and forming the sole connection between the wheel or equivalent and the aircraft, and the present invention has for its object to provide an improved rotational damping device for a mounting of this kind. It has previously been proposed, in mountings of this kind, to mount the plunger of the shock absorber strut for rotational movement in its cylinder and to provide variable frictional damping of such rotational movement controlled by the relative movement of the parts of the strut. With that arrangement the damping, whilst proportional to the load on the strut when the latter is in equilibrium, is not proportional to the dynamic loading. It has, moreover, been proposed to fix the plunger against rotational movement in the cylinder and to mount the cylinder for rotational movement in the aircraft frame, a manually controllable friction band being provided to restrict the rotation of the cylinder. In this case the restriction does not vary with the loading of the strut.

According to the present invention, a mounting for a landing wheel or equivalent landing member comprising a resilient telescopic strut supporting the landing member, and movable bodily in a rotational sense in the aircraft framework, is characterised by the feature that a frictional damping device acting on the cylinder member of the strut is controlled by the load on the strut to provide variable damping increasing in degree with the dynamic loading of the strut. The degree of damping is preferably reduced substantially to zero when the strut is unloaded, i. e. when the aircraft is airborne, in order to provide for free operation of self-centering mechanism acting on the strut.

According to a further feature of the invention, a mounting of the kind referred to for an aircraft landing wheel or equivalent landing member comprising a resilient telescopic strut supporting the landing member and movable bodily in a rotational sense in the aircraft framework is characterised by the feature that a friction brake acting on the cylinder member of the strut is applied by a pressure derived from the loading of the strut and proportional to the said loading.

The friction damping device may comprise a washer of friction material interposed between a shoulder on the cylinder member of the strut and a surface to which the upward thrust on the mounting is transmitted from the said shoulder.

Alternatively, the friction damping device may comprise a circumferential friction member adapted to be moved radially inwardly or outwardly to engage a cooperating cylindrical surface, the movement of the friction member being effected by the load on the resilient member of the strut.

The cylinder of the strut may be mounted for rotation in a sleeve surrounding its lower end, and the strut may be provided with self-centering mechanism tending to return the wheel to a fore-and-aft position, the non-rotating part of the self-centering mechanism being preferably connected to the sleeve by a torque tube.

The invention is hereinafter described with reference to the accompanying drawings, in which.

Figure 1:
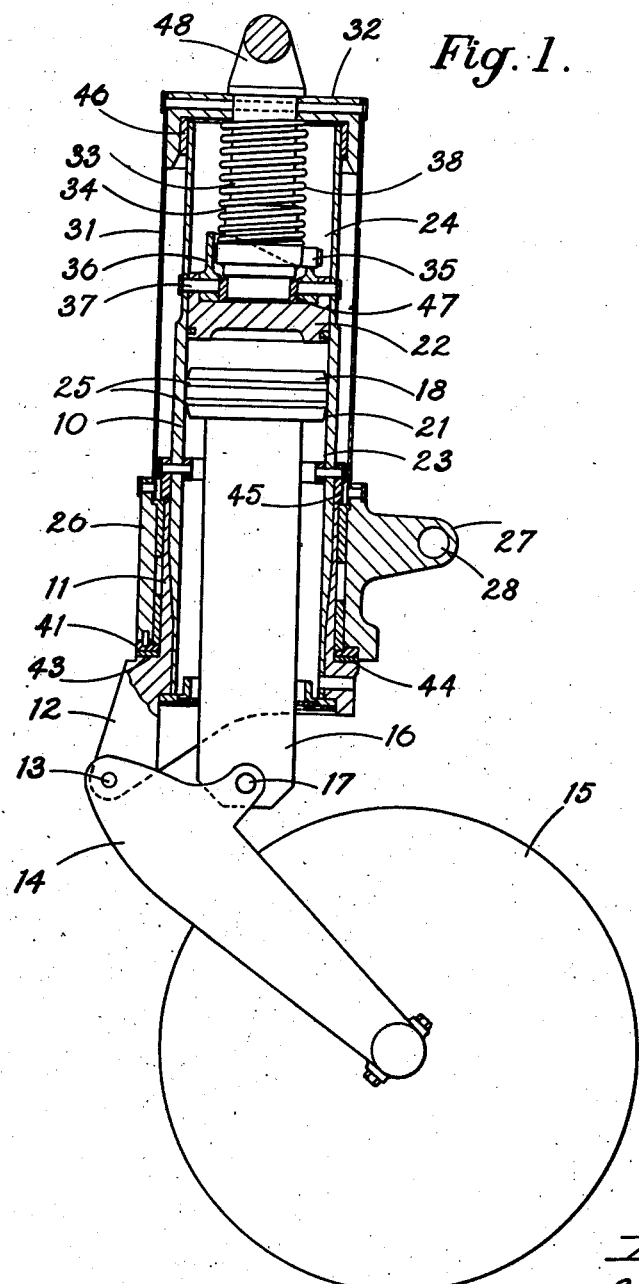
Figure 1 is an elevation, partly in section, of one form of mounting according to the invention.

In the form of mounting shown in Figure 1, the cylinder 10 of a resilient telescopic strut has secured to its lower end a sleeve 11 forming an integral part of the cylinder assembly. From the sleeve 11 projects a bracket 12 to which, at a point 13 offset somewhat from the axis of the cylinder 10, is pivotally secured one end of a forked arm 14 in which the wheel 15 is mounted, the arm 14 being so arranged that the wheel axis is on the opposite side of the cylinder axis to the pivot of the arm. A tubular plunger 16 pivotally secured to the arm 14 at 17 near its pivoted end extends into the cylinder 10, and is formed at its upper end with an enlarged head 18 fitting closely within the cylinder, the head having its peripheral surface 21 which engages the wall of the cylinder of substantially part-spherical form, so that it may rock slightly during the movements of the arm 14 about its pivot. The cylinder 10 is closed in a fluid-tight manner by a partition 22 between its ends, the part 23 below the partition forming the cylinder in which the plunger 16 operates, whilst the part 24 above the partition houses a self-centering mechanism to be described below. The plunger tube 16 itself is closed at its lower end, and, with the lower part 23 of the cylinder 10, constitutes an oleo-pneumatic shock absorber, the air chamber of which is the plunger tube, whilst the damping is controlled by orifices (not shown) in the plunger head 18. The air is confined in the plunger tube by a floating piston (not shown) mounted therein. The plunger head 18 is provided with suitable packing means 25 to prevent the escape of the shock absorber liquid into the part of the cylinder below it.

The cylinder 10 is rotatably mounted in a bearing sleeve 26 which surrounds its lower end and is formed with a lug 27 in which is provided a hole 28 to receive a mounting spindle about which the mounting can swing for retraction.

At the upper end of the cylinder 10, and connected to the sleeve 26 by a torque tube 31 is a cap 32 from which a hollow stem 33 extends into the cylinder. Slidable on the stem 33 is a sleeve 34 carrying a roller 35 which engages the face of a cam 36 secured by pins 37 to the partition 22, the sleeve 34 being urged downwardly by a spring 38 to keep the roller in contact with the cam. The cam 36 is symmetrical about a diameter of the cylinder, having a low point at one end of the said diameter and a high point at the opposite end joined by a smooth slope. As the spring 38 tends constantly to return the roller 35 to the lowest point of the cam the cylinder is constantly urged towards a selected angular position which, of course, is when the mounting is mounted in an aircraft, such that the wheel lies in a fore-and-aft plane.

The sleeve 26 surrounding the lower end of the cylinder has a ring 41 with a flat annular lower face secured by dowels 42 to its lower end, the ring 41 lying opposite to the upper surface of an enlargement 43 at the lower end of the sleeve 11. Between a flat annular face on the upper surface of the enlargement, and the ring on the bearing sleeve, is mounted a ring 44 of friction material either loose or secured to one or other of the surfaces, the combination forming in effect a friction clutch. The cylinder has a small degree of longitudinal play in the bearing sleeve 26, being retained therein by a collar 45 secured to the cylinder above the sleeve, and the load on the strut is taken solely through the friction material 43, with the result that the pressure thereon varies with the load on the strut, and becomes zero when the aircraft is airborne. The resistance to turning of the cylinder in its bearings is clearly dependent on the pressure applied to the clutch, and therefore is dependent on the load on the strut.

Bearing bushes 46 and 47 are provided between the cylinder 10 and the cap 32 and between the stem 33 and the cam 36, and an extension of the stem 33 outside the cap 32 forms a fork 48 to which may be attached a jack or folding strut by means of which the mounting is retracted.

It will be readily understood that, as the thrust transmitted between the strut and the aircraft is transmitted through the friction material, the load on the latter, and therefore the friction damping, is proportional to the load on the strut at any instant. When the aircraft is airborne the friction material is unloaded, and the strut is free to turn under the influence of the self-centering mechanism.

A plurality of discs of friction material alternating with metal discs may be employed between the enlargement 43 on the sleeve 11, and the bearing sleeve, the friction discs being rotationally coupled to one member and the metal discs to the other, thus increasing the frictional resistance to rotation.

In an alternative arrangement, the load is transmitted between the shock absorber and the aircraft by an ordinary thrust bearing, the ring 44 of friction material being omitted, and a friction band surrounding the cylinder is applied to a drum surface by suitable mechanism actuated by the fluid pressure in the strut.

Figure 2:
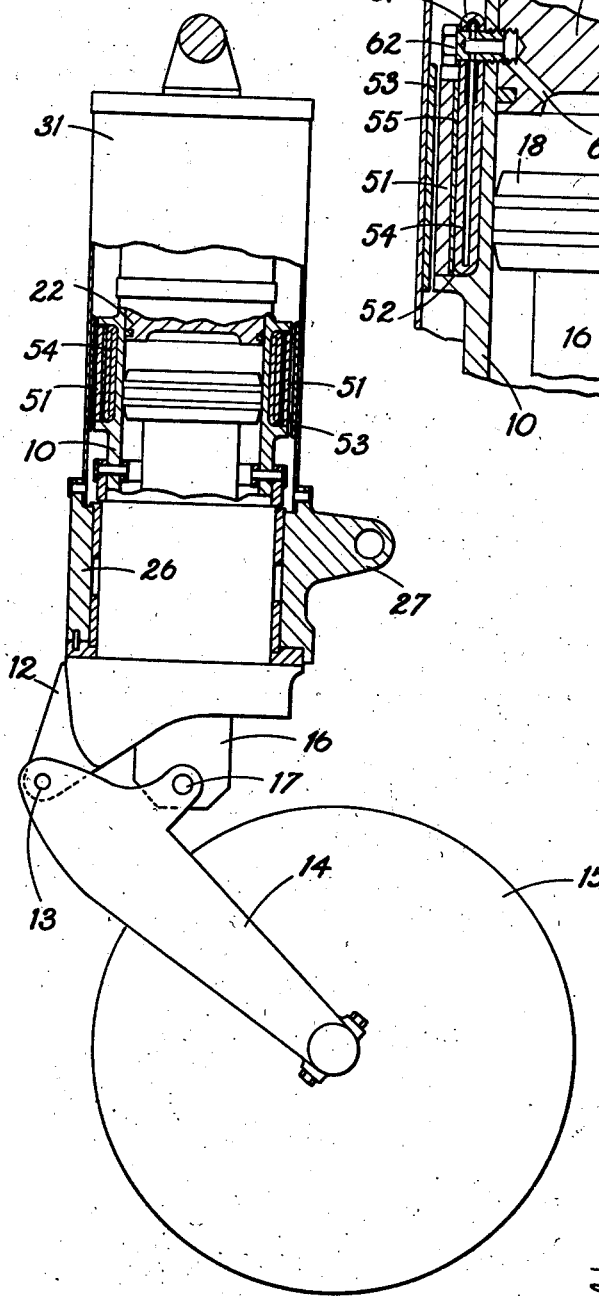
Figure 2 is a similar elevation of another form of mounting according to the invention.
Figure 3:
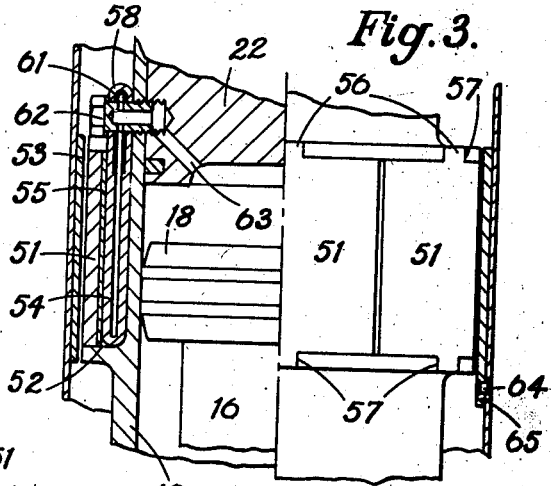
Figure 3 is a detail view of a part of Figure 2, on a larger scale.

Referring to Figures 2 and 3, in which is shown a mounting unit generally similar to that shown in Figure 1, the cylinder 10 being divided by a partition 22 into upper and lower chambers, in the upper of which is provided the self-centering mechanism (not shown) whilst the lower receives the plunger 16 of the shock absorber, the frictional damping device comprises a series of shoes 51 mounted in a channel 52 around the cylinder 10, and adapted to engage with a sleeve 53 mounted in the torque tube 31. The shoes 51 are moved outwardly to engage the sleeve 53 by fluid pressure acting in an annular capsule 54 of rubber or like material lying in the channel 52, the interior of the capsule being connected to the interior of the lower part of the cylinder 10. Each shoe 51 is formed of friction material, and is secured to a backing of metal 55, lugs 56 being formed on the edge of both shoe and backing to engage slots 57 in the walls of the channel 52 to permit radial movement of the shoes whilst preventing circumferential movement. The connection between the capsule 54 and the interior of the strut is provided in the following manner. An ear 58 projecting from the capsule is stiffened internally by a metal lining 61 moulded therein, and is apertured to receive a hollow bolt 62 screwed into the wall of the cylinder 10 and the partition 22. A channel 63 in the partition connects the passage through the bolt to the interior of the cylinder. The sleeve 53 is secured in the torque tube 31 by rivets 64 passing through lugs 65 projecting from the edge of the sleeve.

It will be apparent that the pressure in the capsule 54 will vary with the pressure in the shock absorber and so the friction damping will be increased as the pressure in the shock absorber increases. A stop may be provided to limit the expansion of the resilient element of the shock absorber, so that when there is no external load on the mounting the pressure in the damping liquid falls to zero, and the frictional damping is entirely eliminated.

It will be seen that in the arrangements described herein it is the dynamic loading of the strut which controls the degree of friction damping, since, in the arrangement described with reference to Figure 1, the dynamic loading must be transmitted through the friction clutch, and in the arrangement described with reference to Figures 2 and 3 the damping is controlled by the pressure in the strut, which must correspond to the dynamic load.

The invention may be applied to mountings in which the wheel is mounted by means of a fork or the like directly on the plunger of the strut, but is more particularly applicable to mountings of the kind more specifically described herein, in which the wheel is mounted on a pivoted arm or lever, the cylinder in this case being required to rotate with the plunger for castoring movement.

The mounting, according to the invention, may be employed for either a nose wheel or a tail wheel of an aircraft, and may, as indicated in the description of Figure 1, be made capable of retraction into the fuselage of the aircraft to reduce drag when in flight.

If the mounting is not designed for retraction, the torque tube in Figure 1 may be omitted, the cap 32 being held against rotary movement in the aircraft by its attachment thereto. Similarly, in Figure 2 the torque tube may be omitted and the sleeve 53 secured in any suitable manner in the aircraft framework.

The shock absorber of the mounting need not be of the oleo-pneumatic type. In the arrangement shown in Figure 1 it may be of a pneumatic type or may have a spring as the resilient element. In the arrangement shown in Figures 2 and 3 the shock absorber must employ a liquid damping medium, but may utilise either a spring or a body of gas as its resilient element.

What I claim is:

1. In an aircraft landing wheel mounting, a telescopic strut comprising a cylinder member mounted for rotational movement in the aircraft framework, a plunger member mounted to rotate with the cylinder member, resilient means tending to move said plunger member outwardly with respect to said cylinder member, damping liquid in said strut, orifice means for restricting the flow of liquid during compression of the strut, a bearing sleeve surrounding said cylinder member and serving to position said cylinder member in the aircraft, a bearing surface on the lower end of said sleeve, a shoulder on said cylinder opposite to the said bearing surface, a washer of friction material disposed between said bearing surface and said shoulder, and means for preventing substantial downward movement of said cylinder member through said sleeve.

2. In an aircraft landing wheel mounting, a telescopic strut comprising a cylinder member mounted for rotational movement in the aircraft framework, a plunger member mounted to rotate with the cylinder member, resilient means tending to move said plunger member outwardly with respect to said cylinder member, damping liquid in said strut, orifice means for restricting the flow of said liquid during compression of the strut, a bearing sleeve surrounding said cylinder member and serving to position said cylinder member in the aircraft, a bearing surface on the lower end of said sleeve, a shoulder on said cylinder opposite to the said bearing surface, frictional damping means disposed between said bearing surface and said shoulder, and means for preventing substantial downward movement of said cylinder member through said sleeve.

3. In an aircraft landing wheel mounting, a telescopic strut comprising a cylinder member mounted for rotational movement in the aircraft framework, a plunger member mounted to rotate with the cylinder member, resilient means tending to move said plunger member outwardly with respect to said cylinder member, a variable volume chamber in said cylinder member bounded on one side by the plunger, damping liquid in said chamber, means for permitting restricted flow of liquid from said chamber during compression of the strut, a circumferential friction brake for resisting rotational movement of said cylinder member, and means operated by the pressure of the liquid in said chamber to apply said brake.

4. In an aircraft landing wheel mounting, a telescopic strut comprising a cylinder member mounted for rotational movement in the aircraft framework, a plunger member mounted to rotate with the cylinder member, resilient means tending to move said plunger member outwardly with respect to said cylinder member, a variable volume chamber in said cylinder member bounded on one side by the plunger, damping liquid in said chamber, means for permitting restricted flow of liquid from said chamber during compression of the strut, a circumferential channel in said cylinder member, braking members in said channel, means for preventing circumferential movement of said braking members in said channel, liquid pressure operated means for moving said braking members radially in said channel, connecting means between said liquid pressure operated means and the liquid chamber in the strut, and a braking surface rigidly mounted in said aircraft and surrounding said braking members.

5. In an aircraft landing wheel mounting, an aircraft framework member, a telescopic strut comprising a cylinder member mounted for rotational movement in the framework member, a plunger in the cylinder member, damping fluid in said cylinder member compressible by said plunger upon loading of the strut, friction means on one of said members, movable means on the other of said members engageable with said friction means to dampen relative movement therebetween, and means responsive to the pressure of said fluid for moving said movable means to engagement with said friction means in response to loading of the strut.

6. In an aircraft landing wheel mounting, a telescopic strut comprising a cylinder member mounted for rotational movement in an aircraft framework, a plunger member mounted to rotate with the cylinder member, said cylinder member and said plunger defining a chamber, resilient means tending to move said plunger member outwardly with respect to cylinder member, damping liquid in said cylinder for damping the movement of said plunger, orifice means for allowing restricted escape of said liquid from said chamber during loading of the strut, frictional means on said framework member, and means on said cylinder member subject to the pressure existing in said damping liquid due to loading of the strut for engaging said friction means, whereby to provide relatively increased damping of rotational movements of the strut upon increased loading thereof.

SYDNEY MacDONALD PARKER.